United States Patent
Howells et al.

(10) Patent No.: US 10,799,832 B2
(45) Date of Patent: Oct. 13, 2020

(54) CATALYST ARTICLE FOR USE IN AN EMISSION TREATMENT SYSTEM

(71) Applicant: JOHNSON MATTHEY PUBLIC LIMITED COMPANY, London (GB)

(72) Inventors: Heledd Howells, Saint Albans (GB); David Micallef, Royston (GB); Andrew Newman, Royston (GB); Neil Greenham, Royston (GB)

(73) Assignee: Johnson Matthey Public Limited Company, London (GB)

( * ) Notice: Subject to any disclaimer, the term of this patent is extended or adjusted under 35 U.S.C. 154(b) by 85 days.

(21) Appl. No.: 15/935,178

(22) Filed: Mar. 26, 2018

(65) Prior Publication Data
US 2018/0280879 A1  Oct. 4, 2018

(30) Foreign Application Priority Data
Mar. 30, 2017 (GB) .................................. 1705158.2

(51) Int. Cl.
*B01J 23/22* (2006.01)
*B01J 23/42* (2006.01)
(Continued)

(52) U.S. Cl.
CPC ..... *B01D 53/9468* (2013.01); *B01D 53/9418* (2013.01); *B01D 53/9436* (2013.01);
(Continued)

(58) Field of Classification Search
CPC ... B01J 23/22; B01J 23/42; B01J 23/63; B01J 29/46; B01J 29/763; B01J 29/78; B01J 29/80; B01J 35/0006; B01J 35/04; F01N 3/2066; F01N 3/2842; B01D 53/9418; B01D 53/9436; B01D 53/9468; B01D 53/9472
See application file for complete search history.

(56) References Cited

U.S. PATENT DOCUMENTS 9,227,176 B2 * 1/2016 Andersen ............. B01J 37/0244
9,579,603 B2 * 2/2017 Sonntag ............... B01J 35/0006
(Continued)

FOREIGN PATENT DOCUMENTS

DE   102016110999 A1   12/2016
GB     2541500 A        2/2017
(Continued)

*Primary Examiner* — Cam N. Nguyen

(57) ABSTRACT

A catalyst article for treating a flow of a combustion exhaust gas comprises: a catalytically active substrate comprising one or more channels extending along an axial length thereof through which, in use, a combustion exhaust gas flows, the one or more channels having a first surface for contacting a flow of combustion exhaust gas; wherein the substrate is formed of an extruded vanadium-containing SCR catalyst material, wherein a first layer is provided on at least a portion of said first surface, wherein the first layer comprises an ammonia slip catalyst composition comprising one or more platinum group metals supported on titania, a silica-titania mixed oxide, a Ce—Zr mixed oxide, or a mixture thereof, and a second layer is provided on at least a portion of the first layer and comprises an SCR catalyst composition.

14 Claims, 1 Drawing Sheet

(51) Int. Cl.
*B01J 23/63* (2006.01)
*B01J 29/46* (2006.01)
*B01J 29/76* (2006.01)
*B01J 29/78* (2006.01)
*B01J 29/80* (2006.01)
*B01J 35/00* (2006.01)
*B01J 35/04* (2006.01)
*F01N 3/20* (2006.01)
*F01N 3/28* (2006.01)
*B01D 53/94* (2006.01)
*B01J 37/02* (2006.01)
*B01J 37/00* (2006.01)
*B01J 37/08* (2006.01)

(52) U.S. Cl.
CPC .......... *B01D 53/9472* (2013.01); *B01J 23/22* (2013.01); *B01J 23/42* (2013.01); *B01J 23/63* (2013.01); *B01J 29/46* (2013.01); *B01J 29/763* (2013.01); *B01J 29/78* (2013.01); *B01J 29/80* (2013.01); *B01J 35/0006* (2013.01); *B01J 35/04* (2013.01); *B01J 37/0009* (2013.01); *B01J 37/0225* (2013.01); *B01J 37/0244* (2013.01); *B01J 37/0246* (2013.01); *B01J 37/08* (2013.01); *F01N 3/2066* (2013.01); *F01N 3/2842* (2013.01); *B01D 2251/2062* (2013.01); *B01D 2251/2067* (2013.01); *B01D 2255/1021* (2013.01); *B01D 2255/20707* (2013.01); *B01D 2255/20723* (2013.01); *B01D 2255/20738* (2013.01); *B01D 2255/20761* (2013.01); *B01D 2255/20776* (2013.01); *B01D 2255/30* (2013.01); *B01D 2255/407* (2013.01); *B01D 2255/50* (2013.01); *B01D 2255/504* (2013.01); *B01D 2255/9025* (2013.01); *B01D 2255/9032* (2013.01); *B01D 2255/911* (2013.01); *F01N 2330/06* (2013.01); *F01N 2370/02* (2013.01); *F01N 2610/02* (2013.01); *Y02T 10/24* (2013.01)

(56) References Cited

U.S. PATENT DOCUMENTS

| | | | | |
|---|---|---|---|---|
| 9,597,636 | B2* | 3/2017 | Sonntag | B01D 53/9472 |
| 9,649,596 | B2* | 5/2017 | Chang | B01D 53/9418 |
| 9,751,080 | B2* | 9/2017 | Fedeyko | B01J 29/74 |
| 9,757,718 | B2* | 9/2017 | Fedeyko | B01J 37/0244 |
| 9,789,441 | B2* | 10/2017 | Larsson | B01J 29/06 |
| 9,849,421 | B2* | 12/2017 | Chandler | B01J 29/763 |
| 9,878,287 | B2* | 1/2018 | Lu | B01J 29/80 |
| 9,937,489 | B2* | 4/2018 | Larsson | B01J 35/0006 |
| 9,993,772 | B2* | 6/2018 | Gilbert | B01D 53/9436 |
| 10,105,692 | B2* | 10/2018 | Andersen | B01D 53/8628 |
| 10,173,173 | B2* | 1/2019 | Andersen | B01D 46/2474 |
| 10,179,329 | B2* | 1/2019 | Phillips | B01J 29/763 |
| 10,188,987 | B2* | 1/2019 | Li | F01N 3/2066 |
| 10,201,807 | B2* | 2/2019 | Larsson | B01D 53/9418 |
| 10,322,372 | B2* | 6/2019 | Chen | B01J 29/072 |
| 10,500,571 | B2* | 12/2019 | Greenham | B01J 29/723 |
| 10,500,574 | B2* | 12/2019 | Fedeyko | B01J 37/0236 |
| 2014/0212350 | A1* | 7/2014 | Andersen | B01J 23/6527 423/237 |
| 2015/0037233 | A1* | 2/2015 | Fedeyko | B01D 46/2474 423/239.1 |
| 2015/0352492 | A1* | 12/2015 | Andersen | B01D 53/8634 423/237 |
| 2016/0040576 | A1 | 2/2016 | Chandler | |
| 2016/0045868 | A1 | 2/2016 | Sonntag | |
| 2016/0367938 | A1 | 12/2016 | Larsson | |
| 2016/0367973 | A1* | 12/2016 | Larsson | B01D 53/9418 |
| 2018/0045097 | A1* | 2/2018 | Tang | B01J 37/0246 |
| 2018/0111086 | A1* | 4/2018 | Chen | B01D 53/9418 |
| 2018/0221860 | A1* | 8/2018 | Larsson | B01J 35/0006 |
| 2018/0264446 | A1* | 9/2018 | Burgess | F01N 3/28 |
| 2018/0280876 | A1* | 10/2018 | Chen | B01D 53/9418 |
| 2018/0280877 | A1* | 10/2018 | Chen | F01N 3/2066 |
| 2018/0280937 | A1* | 10/2018 | Bauer | B01J 37/0009 |
| 2018/0283250 | A1* | 10/2018 | Chen | B01J 23/44 |
| 2019/0001268 | A1* | 1/2019 | Chen | B01J 35/0006 |
| 2019/0091677 | A1* | 3/2019 | Bauer | B01J 23/22 |
| 2019/0168198 | A1* | 6/2019 | Larsson | B01D 53/9418 |
| 2019/0176128 | A1* | 6/2019 | Micallef | B01J 37/0244 |
| 2019/0283011 | A1* | 9/2019 | Chen | B01D 53/9418 |
| 2019/0299160 | A1* | 10/2019 | Chen | B01J 37/0244 |

FOREIGN PATENT DOCUMENTS

| | | |
|---|---|---|
| GB | 2574097 A | 11/2019 |
| WO | 9947260 A1 | 9/1999 |
| WO | 2009093071 | 7/2009 |
| WO | 2011092521 A1 | 8/2011 |
| WO | 2013017873 A1 | 2/2013 |
| WO | 2014027207 A1 | 2/2014 |
| WO | 2015011452 A1 | 1/2015 |
| WO | 2015175921 A2 | 11/2015 |
| WO | 2016205506 A1 | 12/2016 |

* cited by examiner

2

CATALYST ARTICLE FOR USE IN AN EMISSION TREATMENT SYSTEM

The present invention relates to an improved catalyst article for use in an emission treatment system. In particular, it relates to an ammonia slip catalyst formulation provided on an extruded vanadium-containing SCR catalyst with an improved tolerance of vanadium poisoning.

Hydrocarbon combustion in diesel engines, stationary gas turbines, and other systems generates exhaust gas that must be treated to remove nitrogen oxides ($NO_x$), which comprises NO (nitric oxide) and $NO_2$ (nitrogen dioxide), with NO being the majority of the $NO_x$ formed. $NO_x$ is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. $NO_x$ needs to be reduced selectively with a catalyst and a reductant in a process known as selective catalytic reduction (SCR) that converts $NO_x$ into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalysed substrate.

In order to maximize the conversion of NON, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore, the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

Catalysts for oxidizing excess ammonia in an exhaust gas are known. WO2016205506 describes an example of an ammonia slip catalyst. This disclosure includes examples of selective ASC coatings comprising Pt on Alumina provided on extruded vanadium-containing catalysts. The coatings are said to have good resistance to vanadium poisoning.

WO2011092521 describes a wall-flow filter comprising an extruded solid body for use in treating oxides of nitrogen in exhaust gas emissions from internal combustion engines from stationary source and mobile applications. This filter substrate comprises vanadium. WO2009093071 and WO2013017873 describe similar substrates.

WO2015011452 discloses a catalyst article for treating an emission gas.

Accordingly, it is desirable to provide an improved ammonia slip catalyst article and/or tackle at least some of the problems associated with the prior art or, at least, to provide a commercially useful alternative thereto.

According to a first aspect there is provided a catalyst article for treating a flow of a combustion exhaust gas, the article comprising:
a catalytically active substrate comprising one or more channels extending along an axial length thereof through which, in use, a combustion exhaust gas flows, the one or more channels having a first surface for contacting a flow of combustion exhaust gas;
wherein the substrate is formed of an extruded vanadium-containing SCR catalyst material,
wherein a first layer is provided on at least a portion of said first surface, wherein the first layer comprises an ammonia slip catalyst composition comprising one or more platinum group metals supported on titania, a silica-titania mixed oxide, a Ce—Zr mixed oxide, or a mixture thereof, and
a second layer is provided on at least a portion of the first layer and comprises an SCR catalyst composition.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

In use, the extruded vanadium-containing SCR catalyst material in the presence of a nitrogenous reductant acts to reduce $NO_x$ in an exhaust gas. Any excess nitrogenous reductant contacts the ASC in the first layer and is converted into nitrogen. The presence of the second layer comprising further SCR material addresses the issue of $NO_x$ regeneration which can occur when the ASC contacts the nitrogenous reductant. As a result of this configuration the $NO_x$ conversion levels are high.

However, the inventors have found that vanadium can migrate from the substrate into the PGM layer of the ASC coating. This has resulted in deactivation, especially after 580° C./100 hours of engine ageing corresponding to a vehicle end-of-life simulation, and was observed where the PGM support was based on alumina or silica-alumina. Surprisingly, using a different support material for the PGM in the ASC coating, as described herein, it has now been found to allow the ASC functionality to become much more stable. In particular, the inventors have surprisingly found that using a PGM support material based on titania, silica-titania or a Ce—Zr mixed oxide provides an improved poison tolerance, particularly with respect to vanadium, for ammonia slip catalysts (ASCs) coated on extruded vanadium-containing catalyst substrates. This has been demonstrated in particular in comparison to conventional silica-alumina support materials.

Surprisingly, the inventors found that there was still vanadium migration occurring, even with local regions containing up to 1 wt % vanadium in the fresh catalyst. Nonetheless, the degree of vanadium poisoning was much lower. Without wishing to be bound by theory, it is considered that the vanadium and the PGMs associate with different sites in the support material so that the vanadium does not interfere with the catalytic properties of the PGM.

The present invention relates to a catalyst article. By catalyst article it is meant a structure as described herein having catalytic properties. The catalytic properties derive from materials included in the structure or coated thereon.

The article as defined herein includes both a coated catalytic substrate as described herein and also a processed and canned SCR and/or ASC unit suitable for installation on an automobile. The catalyst article provides a heterogeneous oxidation catalyst that is effective at reducing ammonia slip when used for an SCR process or downstream of an SCR process.

The catalyst article is for treating a flow of a combustion exhaust gas. That is, the catalyst article can be used to treat an exhaust gas derived from a combustion process, such as from an internal combustion engine (whether mobile or stationary), a gas turbine for stationary, marine, or locomotive applications, and coal or oil fired power plants. The article may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a gas turbine or a lean-burn engine.

The catalyst article comprises a catalytically active substrate comprising one or more channels extending along an axial length thereof through which, in use, a combustion exhaust gas flows. In use, the one or more channels have a first surface for contacting a flow of combustion exhaust gas. The catalytically active substrate provides an SCR functionality so that the $NO_x$ in the combustion gas is converted into nitrogen and water.

The substrate is formed of an extruded vanadium-containing SCR catalyst material. Examples of such extruded vanadium-containing substrates are provided in WO2011092521, WO2009093071 and WO2013017873, the contents of which are included herein by reference. The use of such a vanadium-containing substrate provides effective SCR properties but provides a risk of vanadium poisoning. Preferably the substrate comprises from 1 to 3 wt %, preferably 1.5 to 2.5 wt %, vanadium oxide. Such levels are suitable for good SCR properties.

The extruded SCR catalyst material preferably further comprises a transition metal-promoted molecular sieve. For example, a preferred substrate is formed of a blend of vanadium/tungsten/titania and an iron-promoted ZSM-5 zeolite as disclosed in WO 2014/027207 A1, the entire contents of which are incorporated herein by reference. Other suitable transition metals and molecular sieves are well known in the art discussed herein.

Preferably the substrate is a honeycomb flow-through monolith substrate. Honeycomb configurations are more compact than plate types, but have higher pressure drops and plug (become blocked) more easily. For most mobile applications the preferred substrates include flow-through monoliths having a so-called honeycomb geometry that comprise multiple adjacent, parallel channels that are open on both ends and generally extend from the inlet face to the outlet face of the substrate and result in a high-surface area-to-volume ratio. For some applications the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. Alternatively, the substrate can be the channels of a so-called wall-flow filter.

A first layer is provided on at least a portion of inside walls of the substrate channels, i.e. the "first surface".

According to one embodiment the first layer covers up to 50% of the axial length of the substrate, preferably from 10 to 40% of the axial length and preferably extends from an end of the article. In this embodiment the remaining uncovered substrate acts as an SCR catalyst to treat $NO_x$ in the presence of a nitrogenous reductant. The coated portion provided by the first layer then acts as an ASC. Preferably the coated portion extends from the downstream end of the substrate in use, such that the ASC acts on any residual ammonia (or the like) before it leaves the substrate.

According to an alternative embodiment the first layer covers at least 50% of the axial length of the substrate, preferably 100% of the axial length. In this embodiment the function of the device may be entirely as an ASC, with the ASC properties provided by the first layer, and this may be located downstream of a separate SCR catalyst in the emission treatment system.

The first layer comprises an ammonia slip catalyst composition. The ammonia slip catalyst composition comprises one or more platinum group metals (PGM) supported on titania, a silica-titania mixed oxide, a Ce—Zr mixed oxide, or a mixture thereof. The PGM is selected from ruthenium, rhodium, palladium, osmium, iridium, platinum and mixtures of two or more thereof. Preferably the PGM is platinum, palladium, or a combination of the two, and most preferably consists of platinum. Preferably the first layer comprises from 0.05 to 0.5 wt % of the platinum group metal, more preferably from 0.1 to 0.2 wt %. Such PGM loadings provide desirable ASC properties. Below the lower limit the durability of the ASC coating is reduced due to sintering of the PGM on heating. Above the upper limit the selectivity of the catalyst is reduced.

The titania, where present in the first layer is preferably anatase because it has a higher surface area. The silica-titania mixed oxide, where present, may be characterised by a silica to titania balance. Preferably, the silica-titania mixed oxide contains less than 50 wt % silica, preferably from 5 to 25 wt % and more preferably from 7 to 15 wt % silica. The Ce—Zr mixed oxide, where present may be characterised by a ceria to zirconia balance. Preferably, the Ce—Zr mixed oxide has a ratio of ceria to zirconia of 60:40 to 30:70 based on the total oxide, i.e. $CeO_2:ZrO_2$.

In addition to the PGM on the listed supports, the first layer may comprise additional components. For example, components such as fillers, binders, stabilizers, rheology modifiers, and other additives. In certain embodiments, the washcoat comprises pore-forming agents such as graphite, cellulose, starch, polyacrylate, and polyethylene, and the like. These additional components do not necessarily catalyse the desired reaction, but instead improve the catalytic material's effectiveness, for example by increasing its operating temperature range, increasing contact surface area of the catalyst, increasing adherence of the catalyst to a substrate and the like. Typically, the only additional component will be a binder. Typically, metal oxide particles used as binders are distinguishable over metal oxide particles used as supports based on particle size, with the binder particles being significantly larger relative to support particles. Preferably the additional components form less than 25 wt %, preferably less than 15 wt %, and most preferably less than 10 wt % of the first layer with the balance PGM and titania, a silica-titania mixed oxide, a Ce—Zr mixed oxide, or a mixture thereof.

Preferably the first layer comprises less than about 5 wt % and more preferably less than about 1 wt % of vanadium when fresh after an initial calcining to fix the layers.

A second layer is provided over the first layer, which second layer comprises an SCR catalyst composition. The second layer contains a catalyst for storing $NH_3$ and selectively reducing $NO_x$ with $NH_3$ in the presence of oxygen, also referred to herein as an SCR catalyst. Preferably, the second layer covers the entirety of the first layer within the channels. Indeed, most preferably the second layer encompasses the first layer such that none of the first layer is able to directly contact the flow of exhaust gases. This configuration provides for improved selectivity to $N_2$ and to have a minimised $N_2O$ and NO and/or $NO_2$ generation. Incomplete coverage or elimination of SCR top layer altogether may increase $NH_3$ conversion at the expense of selectivity (more $N_2O$ and NO and/or $NO_2$ generation over the ASC). A top layer with little or no usable $NH_3$ storage may result in poorer selectivity more $N_2O$ and NO and/or $NO_2$ generation.

Preferably the SCR catalyst composition of the second layer comprises a copper-promoted zeolite, an iron-promoted zeolite or a combination thereof. The first SCR catalyst is preferably a Cu-SCR catalyst, an Fe-SCR catalyst or a mixed oxide, more preferably a Cu-SCR catalyst or an Fe-SCR catalyst, most preferably a Cu-SCR catalyst. The Cu-SCR catalyst comprises copper and a zeolite. The Fe-SCR catalyst comprises iron and a zeolite.

A zeolite is a microporous aluminosilicate having any one of the framework structures listed in the Database of Zeolite Structures published by the International Zeolite Association (LZA). The framework structures include, but are not limited to those of the CHA, FAU, BEA, MFi, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

Preferably the second layer has at least some ammonia storage capacity of up to 0.1 g per g of the second layer when measured at 200° C., preferably from 0.01 to 0.05 g/g and most preferably about 0.025 g/g.

As used herein the terms "first layer" and "second layer" are used to describe the relative positions of catalyst layers in the catalyst article with respect to the normal direction of exhaust gas flow through and/or over the catalyst article. Under normal exhaust gas flow conditions, exhaust gas contacts the second layer prior to contacting the first layer and will then contact the second layer again before leaving the catalyst article. It is noted that the first and second layers are porous by virtue of their structure and permit the exhaust gases to pass within and through the layer material. The first layer is applied to a flow-through honeycomb substrate as a bottom layer and the second layer is top layer that is applied over the first layer.

Techniques for applying the first and second layers are well known in the art and include the application of a washcoat to the surfaces to be coated. After coating the layers onto the article they are typically calcined to fix the layers. Calcining is well known in the art and may be carried out in air at temperatures of about 500° C.

Preferably the catalyst article described herein is canned and ready for use in an automobile exhaust gas treatment system.

According to a further aspect there is provided an emission treatment system for treating a flow of a combustion exhaust gas, the system comprising a source of combustion exhaust gas in fluid communication with the catalyst article described herein, and a source of nitrogenous reductant arranged upstream of said article. Preferably the source of combustion exhaust gas is a diesel engine.

That is, the catalyst article of the present invention may be part an emission gas treatment system wherein the catalyst article is disposed downstream of a source of a nitrogenous reductant. According to one embodiment the article is an SCR catalyst comprising a downstream ASC catalyst portion. For example, the ammonia slip catalyst is disposed on the downstream end of a flow-through substrate and an SCR catalyst is disposed on the upstream end of the flow-through substrate. According to another embodiment the article is an ASC catalyst to be provided downstream of a separate selective catalytic reduction (SCR) catalyst. That is, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick. In both of these embodiments, the ammonia slip catalyst oxidizes at least a portion of any nitrogenous reductant that is not consumed by the selective catalytic reduction process.

The nitrogenous reductant can be ammonia per se, hydrazine or an ammonia precursor selected from the group consisting of urea ($(NH_2)_2CO$), ammonium carbonate, ammonium carbamate, ammonium hydrogen carbonate and ammonium formate. Ammonia is most preferred.

Preferably the first layer covers up to 50% of the axial length of the substrate and is provided extending from a downstream end of the article, in use.

According to a further aspect there is provided a method for treating a flow of a combustion exhaust gas, the method comprising contacting a flow of combustion exhaust gas with the catalyst article described herein in the presence of a nitrogenous reductant.

Although the present disclosure describes first and second layers, it is also contemplated that the first and second layers may be provided as a single mixed layer comprising all of those components described herein for the first and second layers.

The present disclosure will now be described in relation to the following non-limiting figure, in which.

Figure 1:
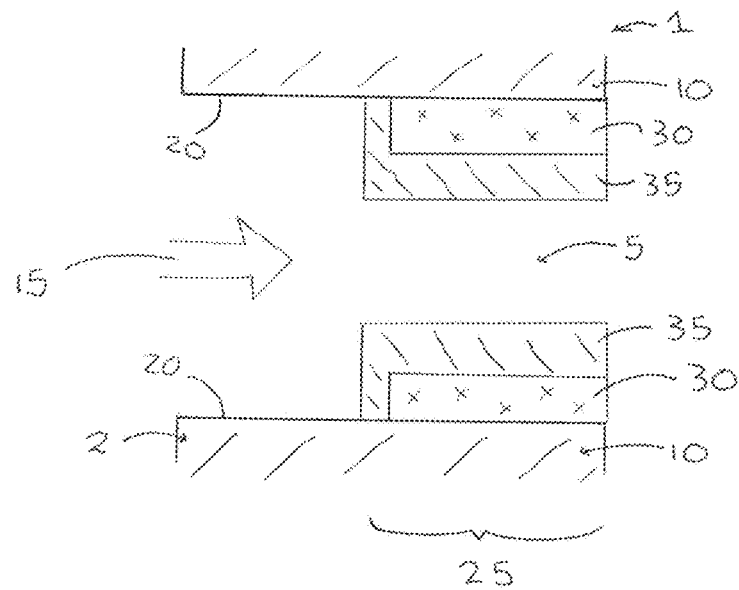
FIG. 1 shows a cross-section of a flow-through monolith substrate.

FIG. 1 shows a single channel 5 within a flow-through substrate 2 according to the catalyst article 1 of the present disclosure. The substrate 1 has walls 10 formed from an extruded vanadium-containing SCR material. The walls 10 define the channel 5 through which an exhaust gas 15 flows. The walls 10 each have a surface 20 for contacting the exhaust gas 15.

Provided on a downstream end 25 of the surfaces 20 is a first layer 30. The first layer 30 comprises an ammonia slip catalyst material comprising Pt on a silica-titania mixed oxide.

The first layer 30 is entirely coated with a second layer 35 comprising an SCR catalyst composition.

In use, the exhaust gas 15 contacts the SCR material in the substrate 1 in the presence of ammonia. This converts the $NO_x$ in the exhaust gas 15 into nitrogen and water.

Excess ammonia in the exhaust gas 15 then contacts the ASC in the first layer 30 and is converted into nitrogen. This conversion can also produce addition $NO_x$ which then contacts the SCR in the second layer 35 and is converted back into nitrogen.

In a preferred embodiment, the flow-through substrate 2 is an extruded blend of vanadium/tungsten/titania and an iron-promoted ZSM-5 zeolite. This is provided with a first layer 30 applied as a washcoat containing about 0.15 wt % Pt, an iron-promoted zeolite and less than 10 wt % of a silica sol binder. The binder helps to make the layer adhere to the substrate but is preferably present in a minimal amount to avoid an increase in back pressure.

A second layer 35 is then applied of an SCR composition comprising an iron-promoted zeolite. This is applied with an alumina binder. The first and second layers 30, 35 may be dried after application and then calcined in air at about 500° C. to fix them.

The completed article 1 is then canned for installation in an exhaust system.

The present disclosure will now be described in relation to the following non-limiting examples.

EXAMPLES

Example 1: Preparation of Extruded Honeycomb Substrate

An extruded honeycomb substrate catalyst according to WO 2014/027207 A1 was prepared by firstly mixing a MFI aluminosilicate zeolite that has been ion-exchanged with >1 wt. % iron with 2 wt. % $V_2O_5$—$WO_3/TiO_2$ balance components with inorganic auxiliaries to improve rheology for extrusion and increase mechanical strength of the extrudate. Suitable organic auxiliaries such as extrusion lubricants and plasticisers can be added to facilitate mixing to form an homogeneous extrudable mass. The organic auxiliaries may include cellulose, water soluble resins such as polyethylene glycol and are burnt out from the final substrate during calcination. The appropriate proportions of the zeolite, $V_2O_5$—$WO_3/TiO_2$, inorganic auxiliaries were selected so that—following removal of the organic auxiliaries—the substrate comprised 16 wt. % of the Fe/zeolite component, 72 wt. % of the $V_2O_5$—$WO_3/TiO_2$ component, 12 wt. % of the inorganic auxiliaries. The extrudable mass was extruded to form 10.5 inch diameter×7.0 inch long and 400 cells per square inch honeycomb bodies in the flow-through configuration (i.e. cells open at both ends) having honeycomb cell wall thicknesses of 11 thousandths of an inch (mil). The extruded honeycomb substrate is then dried and calcined to form the finished product.

Example 2: Preparation of Ion-Exchanged Copper Zeolite SCR Catalyst Washcoat (Second Layer)

Commercially available synthetic aluminosilicate zeolite CHA was $NH_4^+$ ion exchanged in a solution of $NH_4NO_3$, then filtered. The resulting materials were added to an aqueous solution of $Cu(NO_3)_2$ with stirring. The slurry was filtered, then washed and dried. The procedure can be repeated to achieve a 3 wt % metal loading. The final product was calcined.

Comparative Example 3: Preparation of Pt Silica-Doped Alumina Ammonia Slip Catalyst Washcoat (First Layer)

A solution of platinum nitrate was impregnated onto a commercially available silica-doped alumina to form a slurry in which the target Pt content of the silica-doped alumina was 0.2 wt. % and a Pt nominal loading of 3 $g/ft^3$.

Example 4: Preparation of Pt/Silica-Titania Mixed Oxide Ammonia Slip Catalyst Washcoat (First Layer)

A solution of platinum nitrate was impregnated onto a commercially available silica-titania mixed oxide having a silica content of about 10 wt. % to form a slurry in which the Pt content of the silica-titania mixed oxide was 0.2 wt. % and a Pt nominal loading of 3 $g/ft^3$.

Example 5: Preparation of Pt/Ce—Zr Mixed Oxide Ammonia Slip Catalyst Washcoat (First Layer)

A solution of platinum nitrate was impregnated onto a commercially available ceria-zirconia mixed oxide having a ceria content of 50 wt. % to form a slurry in which the Pt content of the ceria-zirconia mixed oxide was 0.2 wt. % and a Pt nominal loading of 3 $g/ft^3$.

Example 6: Coating of Substrates with First Layer Catalyst Compositions

Three honeycomb substrates prepared according to Example 1 were each coated from one end of the honeycomb substrate with a washcoat of the first layer catalyst compositions described in Examples 3 (Comparative), 4 and 5 using the process described in WO 99/47260 A1 to a depth of 2 inches, i.e. a method comprising the steps of (a) locating a containment means on top of the substrate, (b) dosing a pre-determined quantity of a liquid component into said containment means, either in the order (a) then (b) or (b) then (a), and (c) by applying vacuum, drawing the entirety of said quantity of liquid component into at least a portion of the substrate, and retaining substantially all of said quantity within the support, without recycle. The coated substrates were then dried and calcined.

Example 7: Coating of Substrates with Second Layer Catalyst Compositions

The three honeycomb substrates obtained from Example 6 were each further coated with the Cu/zeolite catalyst composition of Example 2 using the same methodology described in Example 6, i.e. WO 99/47260 A1. The second layer coatings were applied via the same end of the honeycomb substrate so that the second layer was coated over the first layer to the extent that none of the first layer was exposed, i.e. the second layer was applied as a slight overlap over the first layer at the end of the first layer distal to the end of the substrate from which the coating was applied, to avoid exposed first layer oxidising ammonia in incoming gas. The coated substrates were then dried and calcined.

Example 8: Ageing Conditions

The extruded catalyst honeycomb substrates resulting from Example 7 were aged thermally (no water present) in an accelerated ageing step either by heating them in an oven at above 600° C. for 2 hours (referred to herein as "fresh") or at 650° C. for 100 hours (referred to herein as "aged") to simulate the expected exposure of the honeycomb substrates to automotive vehicular exhaust gases over a vehicle end-of-life, according to European emission standard legislation.

Example 9: Testing Conditions 1 inch diameter cores were cut from the fresh and aged substrates from Example 7 and were each loaded into a synthetic catalytic activity test (SCAT) laboratory apparatus to test each sample's ability to oxidize $NH_3$ in a simulated exhaust gas containing 500 ppm $NH_3$, 4.5 wt. % CO, 5 wt. % $H_2O$, 200 ppm $CO_2$, 12 wt. % $O_2$, and the balance $N_2$. The test was conducted at an exhaust gas space velocity of 150,000 $hr^{-1}$. The results for % $NH_3$ conversion vs. temperature is shown in FIG. 2.

Figure 2:
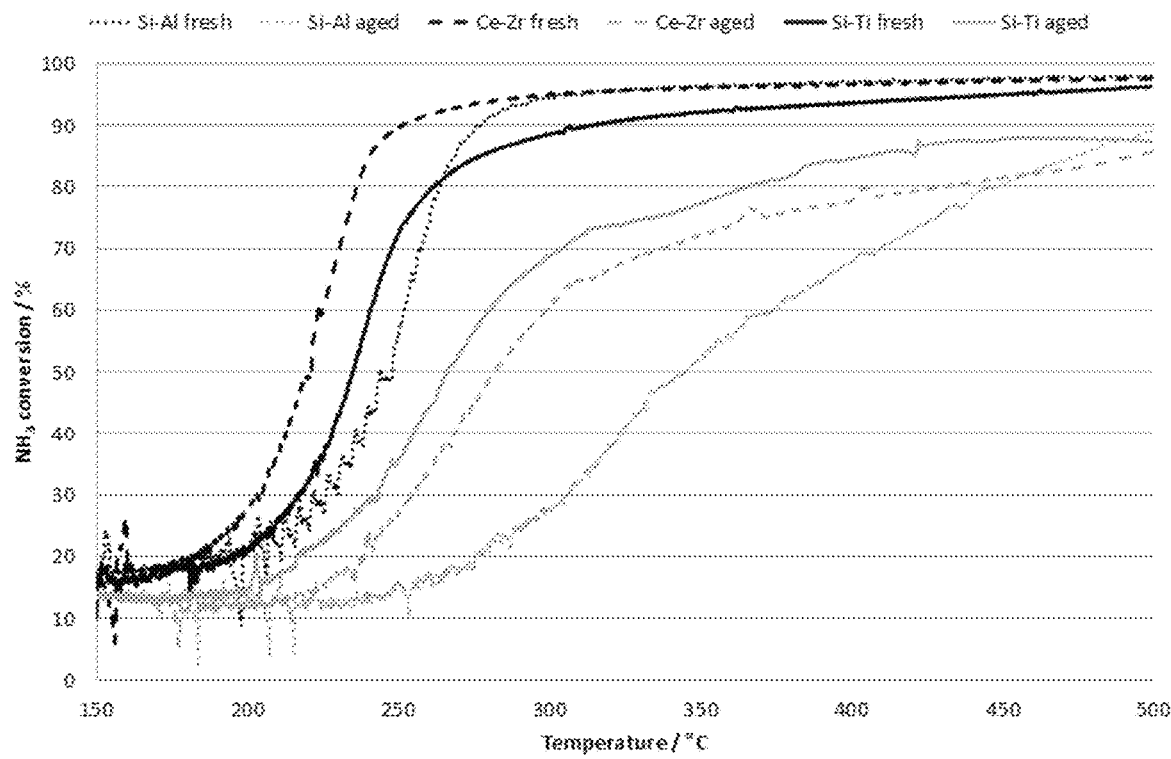
FIG. 2 shows a graph showing activity of fresh and aged catalysts as described herein and in the prior art.

As shown in FIG. 2, the silica-alumina supported catalyst provides good fresh activity, but this falls away on aging. The silica-titania and ceria-zirconia-supported catalysts, have comparable fresh activity which declines much less on aging than the silica-alumina sample.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

For the avoidance of doubt, the entire contents of all documents acknowledged herein are incorporated herein by reference.

The invention claimed is:

1. A catalyst article for treating a flow of a combustion exhaust gas, the article comprising:
   a catalytically active substrate comprising one or more channels extending along an axial length thereof through which, in use, a combustion exhaust gas flows, the one or more channels having a first surface for contacting a flow of combustion exhaust gas;
   wherein the substrate is formed of an extruded vanadium-containing SCR catalyst material,
   wherein a first layer is provided on at least a portion of said first surface, wherein the first layer comprises an ammonia slip catalyst composition comprising one or more platinum group metals supported on titania, a silica-titania mixed oxide, a Ce—Zr mixed oxide, or a mixture thereof, and
   a second layer is provided on at least a portion of the first layer and comprises an SCR catalyst composition.

2. The catalyst article according to claim 1, wherein the substrate is a honeycomb flow-through monolith substrate.

3. The catalyst article according to claim 1, wherein the substrate comprises from 1 to 3 wt % vanadium oxide.

4. The catalyst article according to claim 1, wherein the first layer comprises from 0.05 to 0.5 wt % of the platinum group metal.

5. The catalyst article according to claim 1, wherein the platinum group metal is Pt.

6. The catalyst article according to claim 1, wherein the first layer covers up to 50% of the axial length of the substrate, and extends from an end of the article.

7. The catalyst article according to claim 1, wherein the first layer covers at least 50% of the axial length of the substrate.

8. The catalyst article according to claim 1, wherein the SCR catalyst composition of the second layer comprises a copper-promoted zeolite, an iron-promoted zeolite or a combination thereof.

9. The catalyst article according to claim 1, wherein the second layer has an ammonia storage capacity of up to 0.1 g per g of the second layer when measured at 200° C.

10. The catalyst article according to claim 1, wherein the second layer covers 100% of the first layer by area.

11. An emission treatment system for treating a flow of a combustion exhaust gas, the system comprising a source of combustion exhaust gas in fluid communication with the catalyst article of claim 1, and a source of nitrogenous reductant arranged upstream of said article.

12. The emission treatment system according to claim 11, wherein the first layer covers up to 50% of the axial length of the substrate and is provided extending from a downstream end of the article.

13. The emission treatment system according to claim 11, wherein the source of combustion exhaust gas is a diesel engine.

14. A method for treating a flow of a combustion exhaust gas, the method comprising: contacting a flow of combustion exhaust gas with the catalyst article according to claim 1 in the presence of a nitrogenous reductant.

* * * * *